Nov. 30, 1965  N. GAUDIO  3,220,644
FLIGHT DATA COMPUTER
Filed July 9, 1964  7 Sheets-Sheet 1
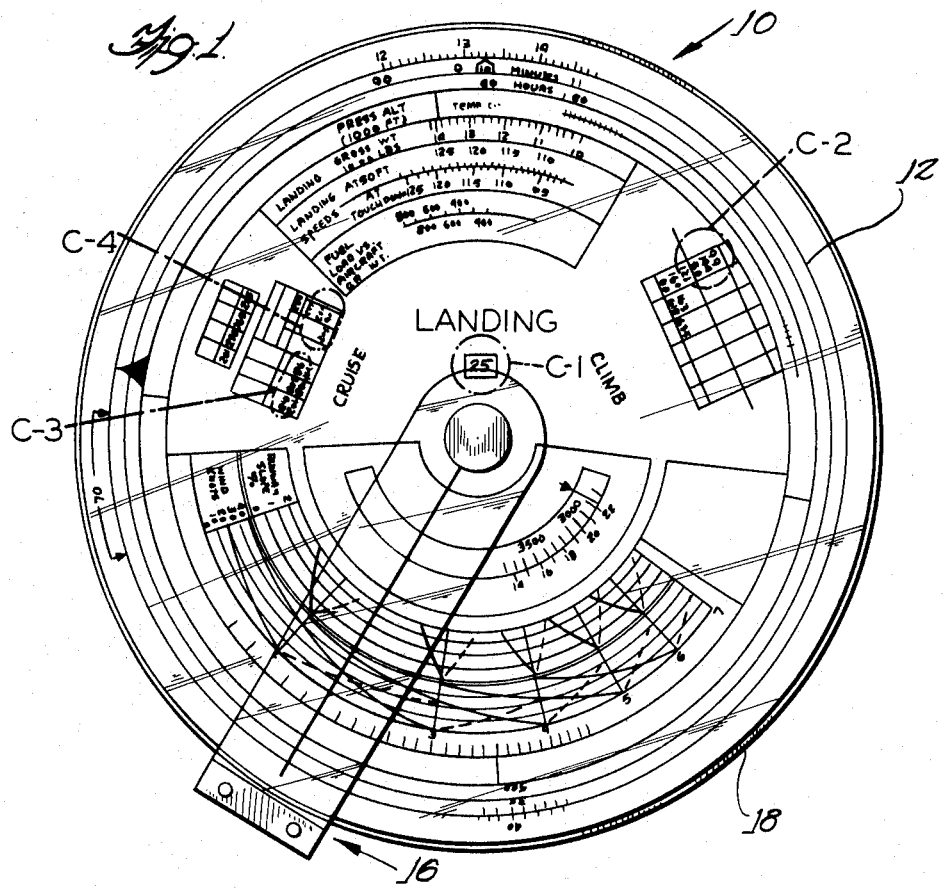
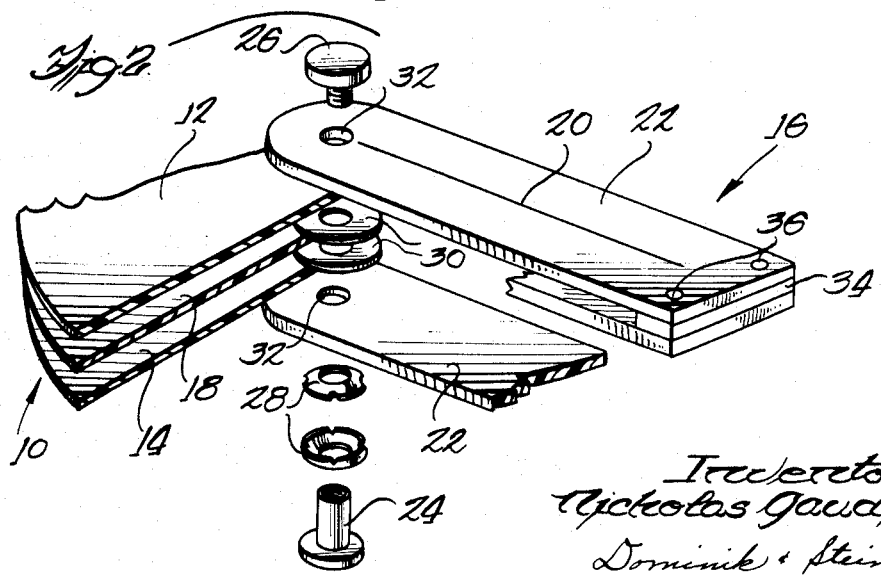
Inventor
Nicholas Gaudio
Dominik & Stein
Attorneys

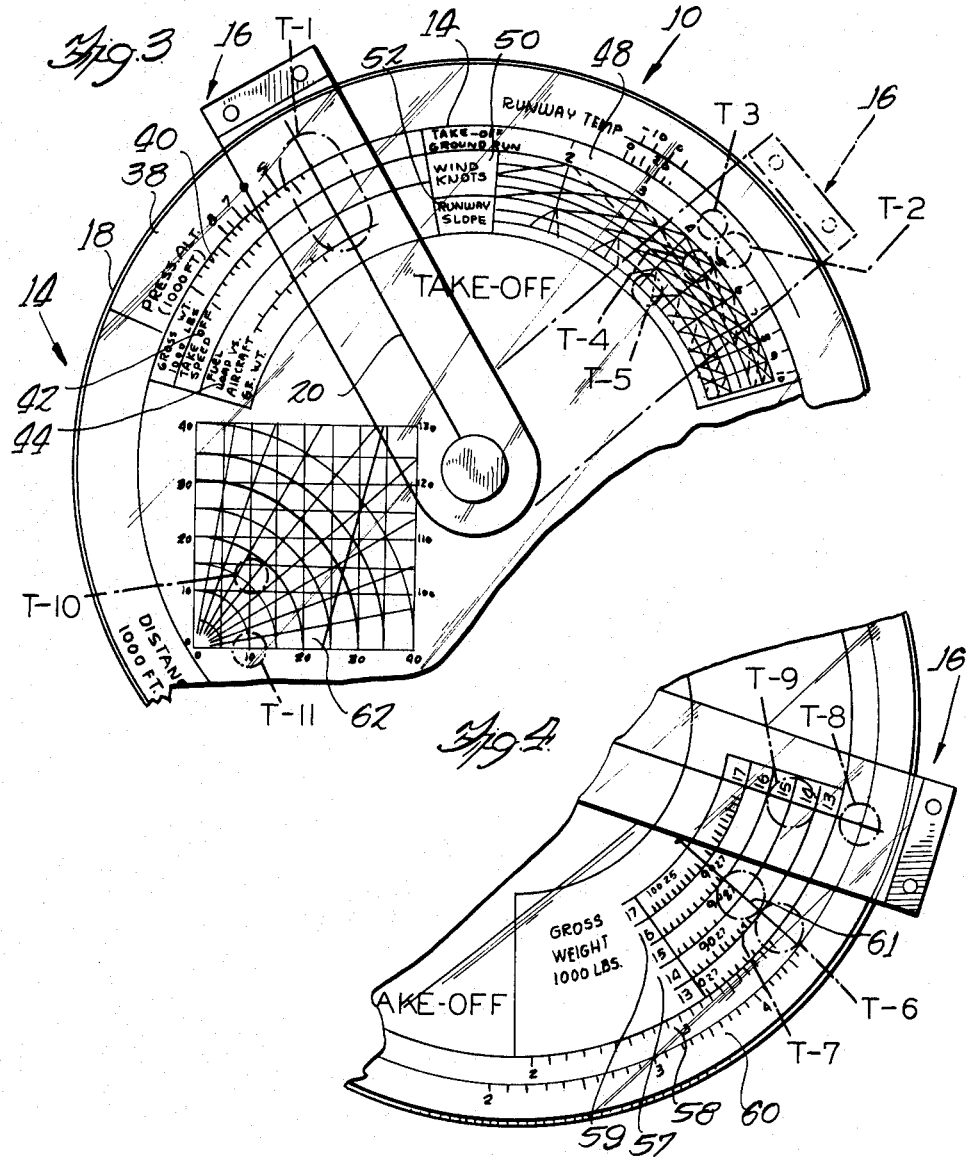

Nov. 30, 1965 N. GAUDIO 3,220,644
FLIGHT DATA COMPUTER
Filed July 9, 1964 7 Sheets-Sheet 3

Inventor
Nicholas Gaudio
Dominik & Stein
Attorneys

Nov. 30, 1965  N. GAUDIO  3,220,644
FLIGHT DATA COMPUTER
Filed July 9, 1964  7 Sheets-Sheet 4
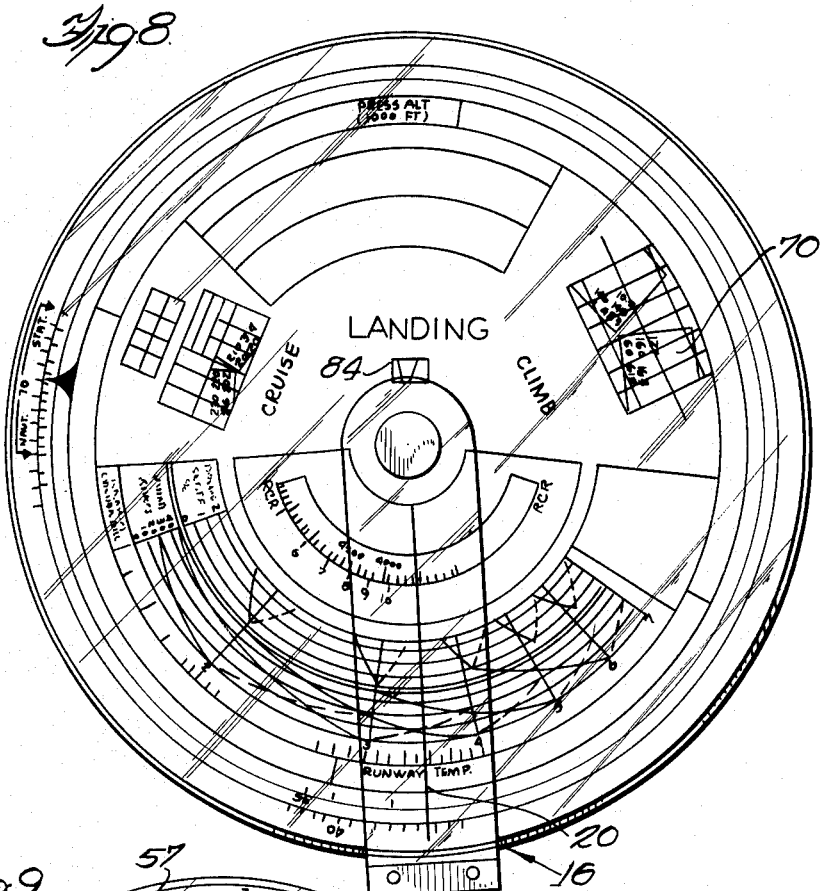
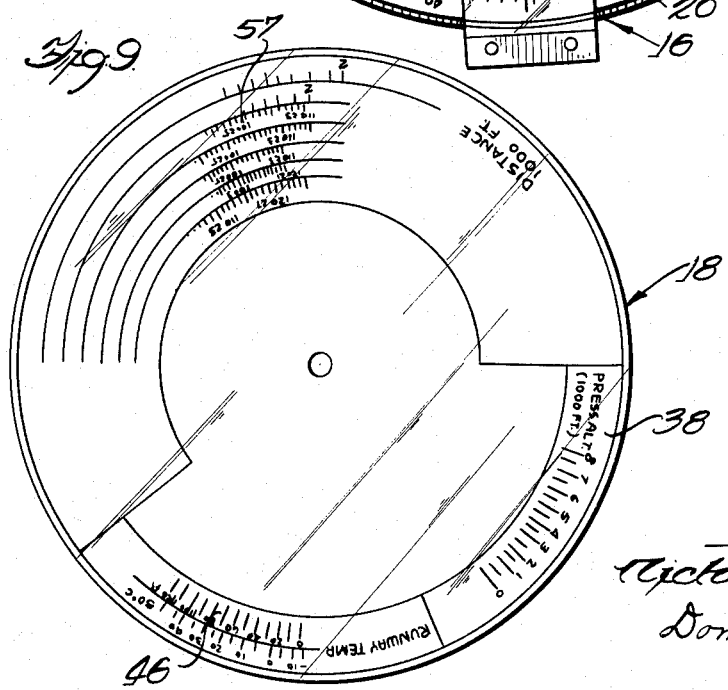

Nov. 30, 1965   N. GAUDIO   3,220,644
FLIGHT DATA COMPUTER
Filed July 9, 1964   7 Sheets-Sheet 6

Inventor
Nicholas Gaudio
Dominik & Stein
Attorneys

Nov. 30, 1965  N. GAUDIO  3,220,644
FLIGHT DATA COMPUTER
Filed July 9, 1964

Inventor
Nicholas Gaudio
Dominik & Stein
Attorneys

United States Patent Office 3,220,644
Patented Nov. 30, 1965

3,220,644
FLIGHT DATA COMPUTER
Nicholas Gaudio, Chicago, Ill., assignor to Felsenthal
Instruments Company, Inc., Chicago, Ill., a corporation of Illinois
Filed July 9, 1964, Ser. No. 381,355
15 Claims. (Cl. 235—78)

The present invention relates to a flight data computer, and more particularly that type of computer which can be utilized, for a given aircraft, to present all of the critical data required by the pilot in command for take-off and landing. In addition, the invention contemplates integrating into the same flight computer various cruise data and navigation scales which are customarily employed by a pilot in the particular aircraft.

Various of the more modern heavy aircraft, and more particularly jet aircraft, because of rapid fuel burn-out, and speed and weight problems, vary widely in their runway utilization depending upon surface conditions.

While numerous computers have been designed for the conversion of factors relating to particular aircraft to take-off and landing information, and while there are numerous booklets and tables available for each such aircraft, normally incorporated in the operational manual, the pilot is required to utilize the operational manual as well as one or more computers in order to work out his critical take-off information.

For example, a given jet training aircraft may have a take-off weight of anywhere from 10,000 to 16,000 lbs. depending upon the amount of fuel on board. The safe take-off speed and the amount of runway required in order to be airborne and clear a 50-foot obstacle can vary by 10% to 30% depending upon the slope of the runway, the headwind component, and the temperature of the air at the runway elevation. These data are normally kept in the form of separate curves in the aircraft operational manual. The pilot, therefore, must refer to various of these curves in order to coordinate his information. The frailties of the human mind being what they are, it is entirely possible that he may transpose a figure, or omit a figure, and make an incorrect calculation. Obviously if the power being put out by the engines is not up to 100% of the rated capacity, no margin for error being provided, a take-off on an exceedingly warm day without a headwind and a slight upslope could result in the pilot not clearing a 50-foot obstacle which on a cool day, with a slight headwind, he would readily clear. The same, of course, is important in landing. In addition to the factors mentioned above of temperature, elevation, and weight, it is also important to be able to correlate the particular runway condition with the "safe stop" distance. Runway conditions have been evaluated in an RCR rating which ranges from 22 on the optimum dry runway to RCR-5 for an icy runway. The same runway which would give an RCR of 22 in dry surface conditions, may very well have an RCR factor of 12 or less when it is raining. The RCR data is supplied regularly to the Tower operator by various ground personnel, and is available to the pilot before landing. By being able to additionally coordinate his runway condition with the calculations for a dry runway, the pilot is able, on a single instrument, to convert his hypothetical landing distance to an actual landing distance based upon conditions extant at the time of landing without reference to any additional charts or other data.

In view of the foregoing, it is a general object of the present invention to provide a flight data computer designed for any particular aircraft which will give the pilot almost instantaneous readings of all of the critical data for take-off and landing. A related object, is to include not only the data regarding take-off and landing, but general data regarding flight fuel consumption and cruise climb data on the same computer.

A further and important object of the present invention is to provide the take-off, cruise, and landing data on a circular computer which is compact in sze and can be readily carried, the subject computer, in one commercial embodiment, not exceeding a 6-inch diameter.

Still another object, more detailed, of the present invention, is to provide a take-off and landing computer for a given aircraft which is color-coded so that the same colored conditions relating to landing are tied into take-off, and vice-versa.

Still another object of the present invention, and important to its working out, is to coordinate the relationship between the various take-off data so that with one setting of the movable member, and one movement of the movable cursor, all of the necessary data for take-off can be assembled by the pilot. Similarly, in a related object, the invention seeks to provide rapid movement to a single setting for the important cruise and fuel data required by the pilot. Finally, looking to implementing the same general objective, the landing data is so positioned and coordinated to reduce to the minimum the number of movements of the movable scale and movable cursor.

Still another object of the present invention is to render the same readily adaptable to use on various aircraft all the way from 10,000 lb. training type jet aircraft up through the largest jet passenger aircraft in operation. The same relative position, orientation, and utilization of the computer can be made through the entire size range, thereby accustoming the pilot to the computer for one aircraft will render it readily usable for other aircraft. In this connection, it will be appreciated that many of the commercial airlines employ pilots who have had previous military training, and accordingly the use of a standardized computer of this character will further reduce the expense of the commercial airlines of re-training their pilots for their type aircraft, and similarly, because of the initial training of the pilot with computers of this character, his safety in operation and the general safety of passengers in all air traffic is improved. Furthermore, the speed with which the pilot is able to adjust his varying calculations with the subject computer will be particularly advantageous as jet aircraft are using shorter runways, and many more take-offs and landings are being made to minimum conditions in connection with feeder-jet operation. It will also be appreciated that where a missed approach is executed, and the aircraft must go to an alternative airport where the runway is not sufficiently long to accommodate all margins of error, and the circumstances are such that the pilot and crew are unusually busy with weather problems and the like, safety will be assured by their being able to immediately calculate the amount of fuel to be burned out so that they can safely land at the alternate airport where the runway may be considerably shorter than that which was intended.

Further objects and advantages of the subject invention will become apparent as the following description of an illustrative embodiment proceeds, taken in conjunction with the accompanying drawings in which:

FIG. 1 is a front view of the landing side of the subject computer showing the cursor, and also indicating at the peripheral portion the time-distance calculating portion of the unit.

FIG. 2 is an exploded perspective view of the cursor physical attachment to the computer itself indicating how the central fixed member and the two flanking movable members are attached thereto.

FIG. 3 is a partially broken view of the subject computer taken from the rear side of that view shown in FIG. 1 and illustrating the take-off side of the computer.

FIG. 4 is a broken view of the computer as shown in FIG. 3, illustrating an additional position of the cursor to obtain additional landing data.

FIG. 8 is a view of the landing portion of the subject flight data computer showing how the calculations are computed for runway temperature and runway slope.

FIG. 9 is a view of the fixed disc showing that side which faces the rear portion of the movable take-off member.

Figure 10:
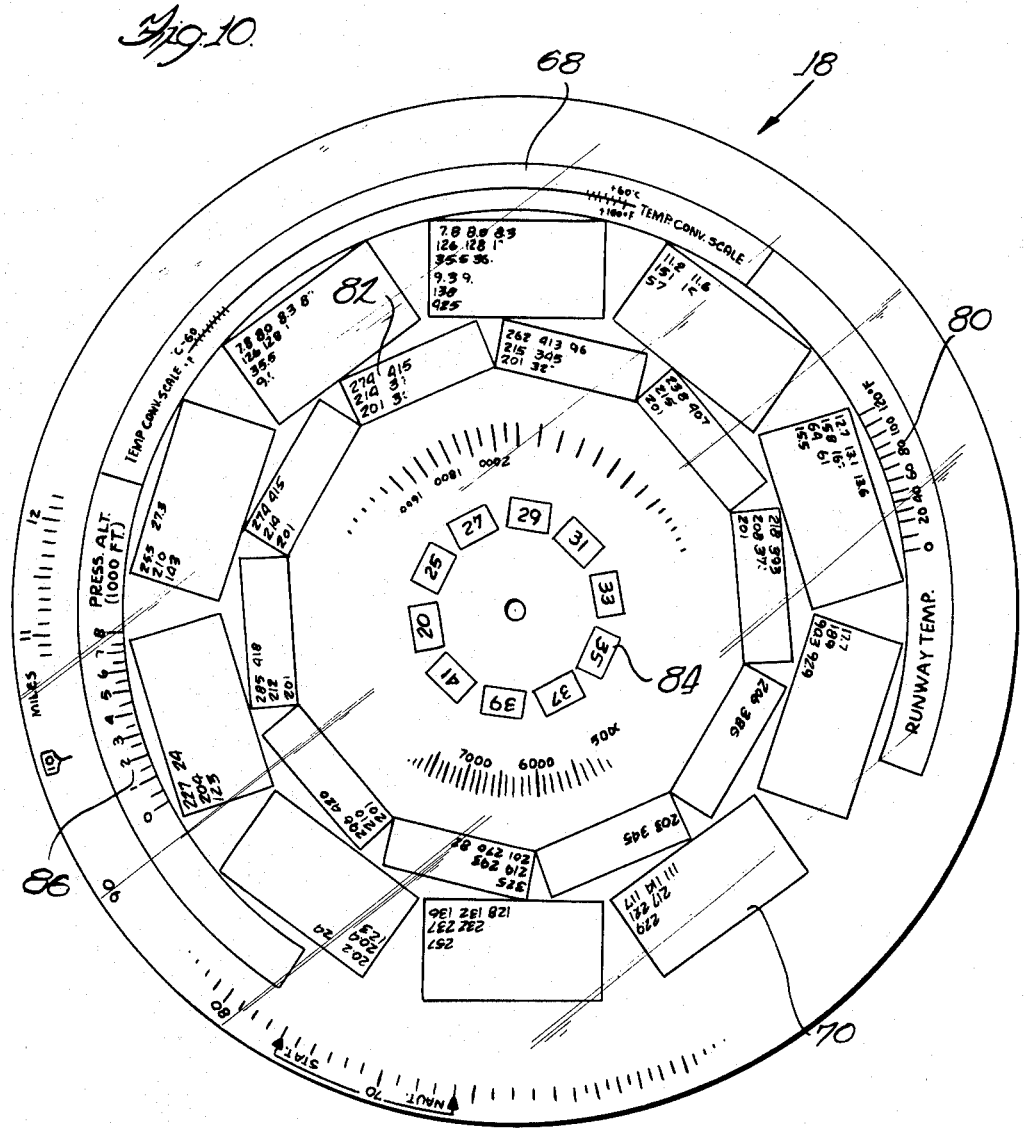

FIG. 10, in enlarged scale, is a view of the reverse side of the fixed disc shown in FIG. 9, showing that portion which abuts adjacent the movable landing disc of the flight data computer.

Figure 11:
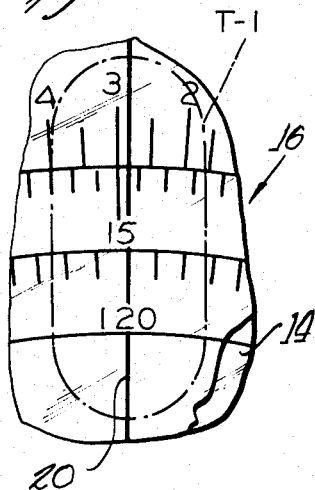
Figure 11A:
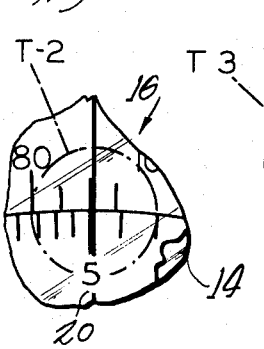
Figure 11B:
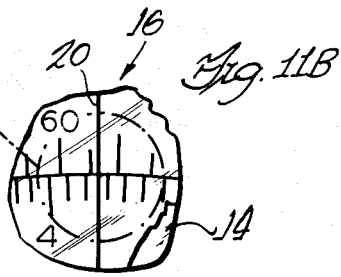
Figure 11C:
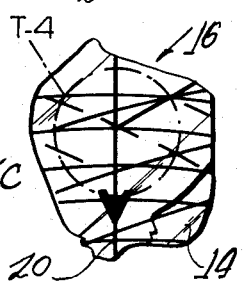
Figure 11D:
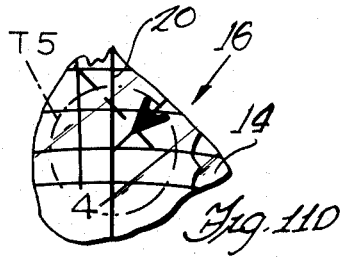
Figure 11E:
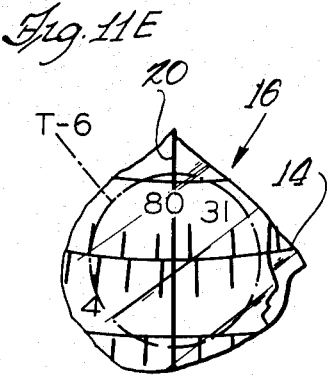
Figure 11F:
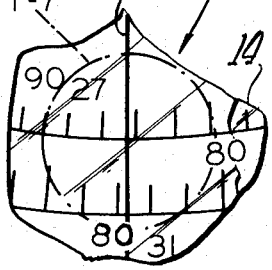
Figure 11G:
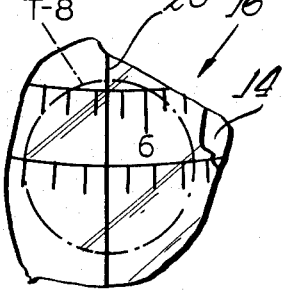
Figure 11H:
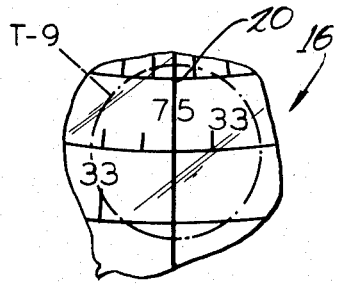
Figure 11I:
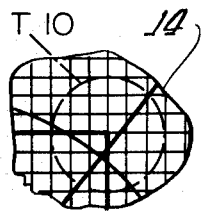
Figure 11J:
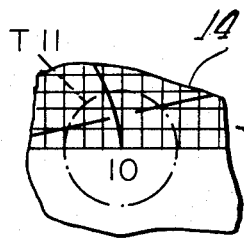

FIG. 11 shows a series of enlarged portions of the take-off side of the computer illustrating the use of the computer for a typical problem, designated T–1 through T–11.

Figure 12:
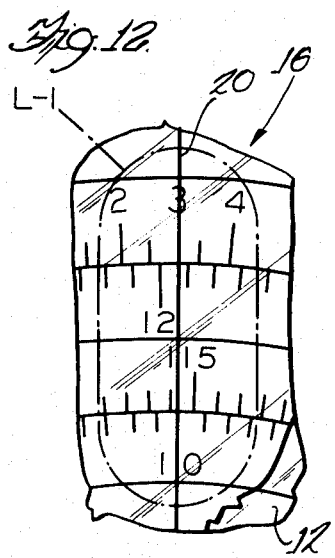
Figure 12A:
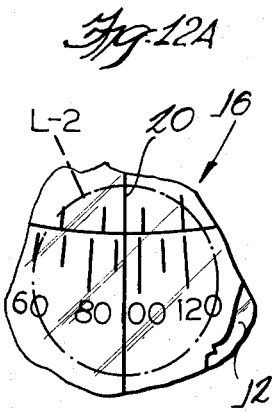
Figure 12B:
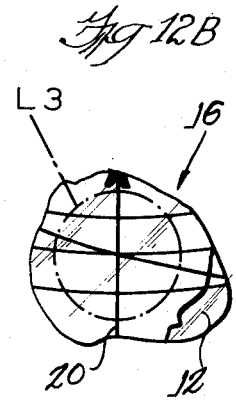
Figure 12C:
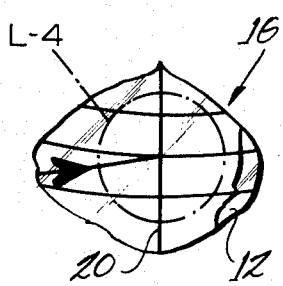
Figure 12D:
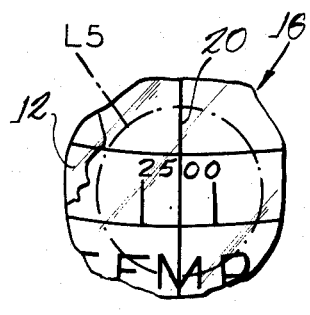
Figure 12E:
Figure 12F:
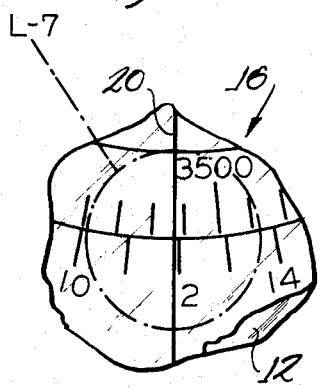

FIG. 12 shows a series of enlarged portions of the landing side of the computer illustrating the use of the computer for a typical problem, designated L–1 through L–7, and C–1 through C–4.

With reference to the drawings, it will be seen that FIG. 1 shows a front elevation of the landing side of the flight data computer 10. The landing disc 12 is movable or rotatable with reference to the base disc 18. A take-off disc 14 (on the reverse side not shown in FIG. 1, but shown in FIG. 3) is also rotatably mounted with respect to the base disc, and mounted for rotation independent of the landing disc. A movable cursor 16 is pivotally mounted at the concentric axis of the three aforementioned discs, and has a hairline 20 which is positioned as a shifting radial from the single concentric axis. As will be described hereinafter in greater detail, by setting the pressure altitude opposite the landing weights, the same being color-coded to match, and reading the runway temperature off of the runway conditions, the landing roll can be quickly calculated. A further reading can be made to correct for the condition of the runway itself.

Referring now to FIG. 2, it will be seen that the cursor 16 is made up of a pair of transparent cursor plates 22 which are positioned in opposed relation, secured together by means of a cursor spacer 34 provided at the end portion. The cursor plates 22 therefore are in the shape of a modified U, each of which contains bolt holes 32 at the unsupported end. An assembly nut 24, threaded internally, mates with an assembly bolt 26 to provide the axis of rotation for the rotatable discs and secure the free ends of the cursor 16. As will be observed, friction washers 28 are coordinated with spacers 30 in order to space the various discs 10, 14, 18 for independent frictionally supported rotation. The frictional relationship between the discs can be adjusted by finger-tightening the assembly bolt 26, or releasing the same. Similarly the units can be disassembled for cleaning, or replacement by merely removing the bolt. It will be appreciated, however, that the principal objectives of the invention are a function of the relative positioning and orientation of the numerical and flight data indicia, and may find successful employment with different physical embodiments of the cursor. For example, the rivets 36 employed to secure the two cursor parallel plates 22 together by means of the cursor spacer 34, as well as the spacer 34, could be eliminated by molding the entire unit from a single piece.

The relative positioning of the technical data for take-off is illustrated in FIGS. 3 and 4. There it will be seen that the pressure altitude arc or sector 38 appears at the periphery of the computer and is fixed to the base disc 18. Reference to FIG. 9 will indicate the particular positioning of the various sectors on the base disc 18. The take-off gross weight 40 appears in the outer arcuate segment of the take-off disc 14. The take-off speed 42 is in the next radially spaced arcuate segment from the take-off gross weight 40, and as further illustrated in FIG. 3, the fuel load conversion to aircraft weight sector 44 is the closest to the center of the computer. Since the take-off speed 42 is a fixed function of the indicated air speed, the cursor 16 may be moved over the fuel load sector 44, and after the weight is determined, then the entire gross take-off weight 40 is converted by a cursor hairline reading to the take-off speed. Both the pressure altitude sector 38, and the take-off and weight data sectors 40, 42, 44, are colored similarly so that the pilot can instantly determine which portion of the movable take-off disc 14 should be set against the pressure altitude sector 38.

Immediately adjacent the weight data sector 40, 42, 44, on the movable take-off disc 14 are positioned respectively the take-off ground run 48 in the outer sector; the wind adjustment 50 (calibrated here in knots) in the second sector; and the runway slope adjustment 52 in the inner sector. Because of the coordinated relationship between the pressure altitude and take-off data, and the runway temperature correction with the take-off ground run (the ultimate result), the pilot merely sets his gross weight 40 sector opposite the pressure altitude 38 so that he can pre-set the take-off ground run portion, and then by rotating the cursor from the position shown in FIG. 3 in solid lines to the position shown in phantom lines, the hairline 20 being positioned over the runway temperature (shown here in Fahrenheit and centigrade) he can read the take-off ground run on the take-off ground run sector 14. This gives a still-air result for the take-off ground run. Thereafter, with a known factor for head or tail wind, the cursor is then moved across the wind adjustment scale 50 and the ground run computation either increased or decreased depending upon whether the wind component is a tail wind or head wind respectively. For a final calculation, the cursor is similarly moved across the runway slope adjustment sector 52 after the headwind or tailwind component has been calculated, and a final determination of the actual length of runway required results. The wind component chart 62 is employed to convert the take-off wind and direction to a runway component.

Accelerated check speed data 54 are shown in heavy figures adjacent the acceleration time 56 (shown in light figures) in the acceleration sector 57. The acceleration sector 57 is all positioned on the base disc 18 (see FIG. 9). Gross weight figures 59 are positioned radially on the movable take-off disc 14, and are connected by arcuate lines so that the proper acceleration check speed 54 and acceleration time 56 can be read for the particular gross weight 59. These figures are thereafter converted with the aid of the acceleration hairline 61 to computed ground run distance 58 and compared against runway available 60.

Figure 5:
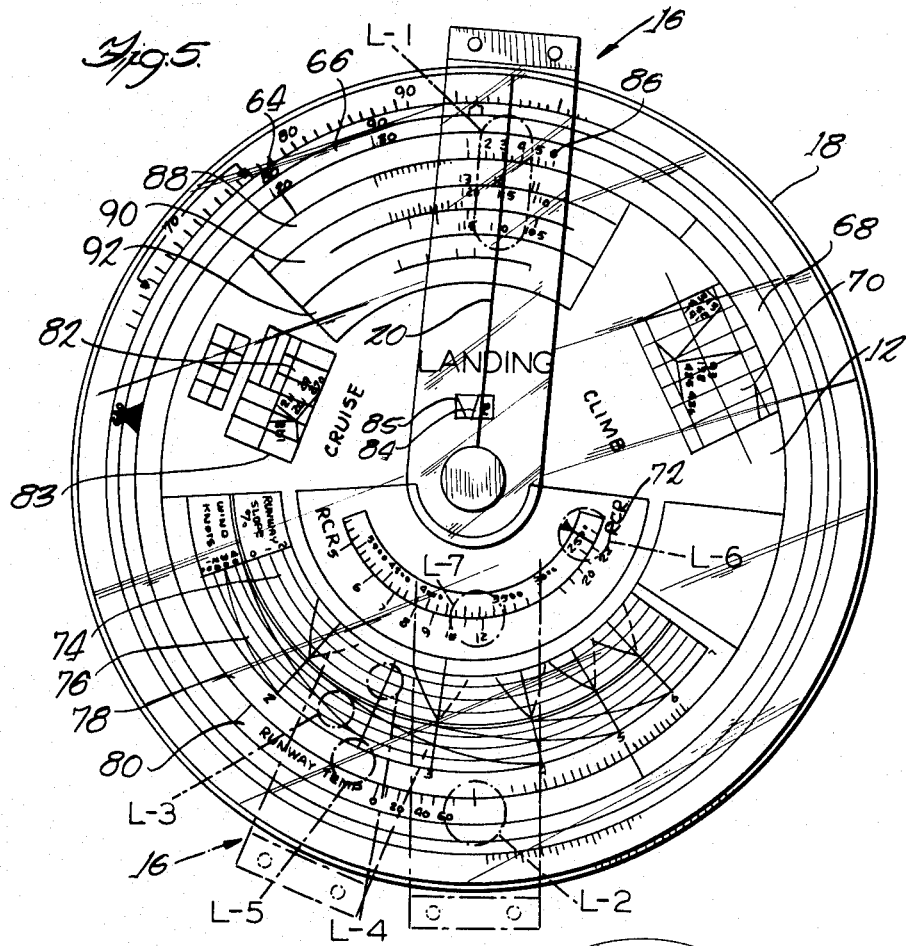
FIG. 5 is a more detailed view of the flight data computer as shown in FIG. 1, and illustrating the calculations made to correct for runway conditions.

Turning now to FIG. 5, the landing side of the flight data computer is best illustrated. There it will be seen that the cursor 16 and the cursor hairline 20 are similar if not identical to that shown on the take-off side. In addition, the landing disc 12 rotates over the base disc 18. The rear portion of the landing disc 12, however, reveals a different window pattern (see FIG. 6) than the rear of the take-off disc 14 (see FIG. 7). Referring now to FIG. 5, it will be seen that the C and D scales for time-distance problems 64, appear at the periphery of the base and landing discs 12, 18. The hour scale 66 is positioned just inside the minute scale, so that the data can be directly converted for the longer time problems.

Figure 6:
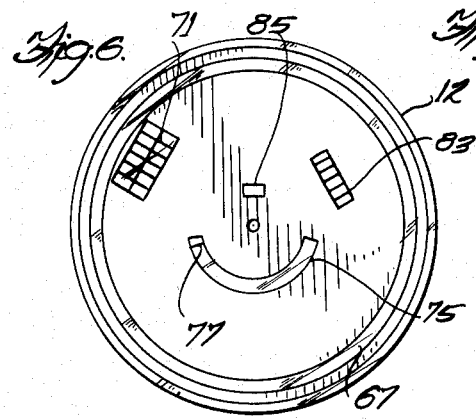
FIG. 6 is a rear view of the movable landing disc.
Figure 7:
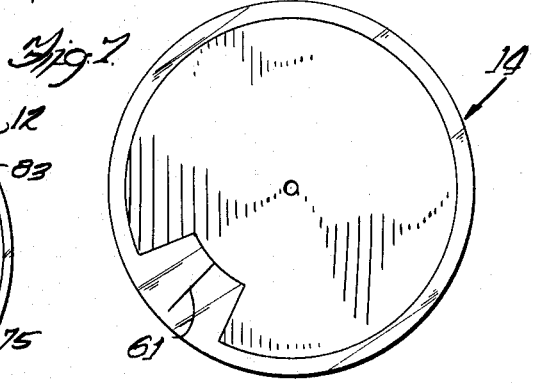
FIG. 7 is a rear view of the movable take-off disc.

A temperature conversion sector 68 is provided at a convenient peripheral sector portion of the base disc 18 (see FIG. 10), and is apparent to the user as it shows through the transparent peripheral window 67 in the landing disc 12 (see FIG. 6). The climb data chart 70 (see FIG. 5) is a rectangular block on the base disc 18

(see FIG. 10) which appears through the climb data window 71 (see FIG. 6) as shown in FIG. 5. As revealed in FIG. 10, there are a plurality of climb data set from varying distances and times depending upon the particular aircraft, but calculated to reveal the average operating ranges for the particular aircraft. The runway condition corrector 72 employs a plurality of runway condition numbers (RCR) on the movable landing disc 12, the runway ground roll 73 being positioned arcuately on the base member 18 (see FIG. 10) in order to show through the runway condition window 75 on the movable landing roll member 12 (see FIG. 6). A runway corrector hairline 77 appears radially in the runway correction window 75 as also illustrated in FIG. 6. The runway slope adjustments 74, runway wind adjustment 76, and landing ground roll sector 78 are positioned in arcuate coordinated sectors as illustrated in FIG. 5 on the outer portion or front reading portion of the landing disc 12. Runway temperature 80, however, as shown in FIG. 10, is on an arcuate sector for the landing side of the base disc 18 and is viewed through the annular window 67 of the landing disc 12. The runway temperature 80 is coordinated with the landing ground roll data to convert the same for varying temperatures, which may be done either before or after the pilot makes his runway slope and wind calculations. The color coding for the runway temperature sector 80 is the same as that for the sector including the runway slope adjustment 74, wind adjustment 76, and landing ground roll 78. In this manner the pilot, as for all other calculations, is able to color code the coordinated elements so that a misreading as a function of getting the wrong base member indicia opposite the landing disc indicia is reduced to a minimum.

A plurality of cruise data material 82 are provided in rectangular blocks on the base disc 18 (see FIG. 10) and appear through the cruise data window 83 which is a transparent member in the rotatable landing roll disc 12 (see FIG. 6).

The altitude/flight level for cruise and climb 84 (see FIG. 10) appears through the altitude window 85 (see FIG. 6) in the rotatable landing disc 12, and is coordinated with both the climb data chart 70 and the cruise data charts 82. Therefore the pilot need only place the proper altitude within the altitude window 85, and he automatically then is able to read off of the climb and cruise data chart 70, 82 the information pertinent to the flight for the particular aircraft for which the computer is provided.

For actual landing computations the pressure altitude sector 86 as shown in FIG. 5 appears through the window 67 in the rotatable landing disc 12 (see FIG. 6), and the indicia are provided on the fixed base member 18 as shown in FIG. 10. Referring back now to FIG. 5 it will be seen that the landing gross weight sector 88, landing speed sector 90, and fuel load plotted against aircraft gross weight 92 sectors are positioned each adjacent the other in the same manner as similar data is positioned on the take-off disc as illustrated in FIG. 3. These landing data 88, 90, 92 are also color coordinated with the pressure altitude sector 86, and therefore the pressure altitude and weight data on both sides of the computer, whether the calculation be for take-off or landing, are the same. In this manner the pilot becomes accustomed to the color coding in both sides of the computer to further eliminate possible error. It has been found in practice that if the pressure altitude and weight data are in green, simulating the color of the earth, this provides a good common denominator for the pilot's consideration. Similarly, the runway temperature wind component, and runway slope and take-off ground run sectors because the wind as well as runway temperature relate to the air, are color coded in blue. The runway condition correctors and the acceleration check speed members are colored in yellow inasmuch as they are cautionary indicia. It will be appreciated that the invention is not primarily dependent upon the selection of the particular color, but on the other hand, the availability of color coding as well as sector division as to the pressure altitude/weight indicia in the use of both sides of the computer is a further safety and convenience factor facilitated by the entire combination of the computer.

*Operation of computer*

The unique features of the subject computer will be better understood as a sample problem is worked. In this particular problem the computer has been adapted for use with a T–33 Trainer jet aircraft with a gross weight of 15,100#, an outside air temperature on the runway of 91° F., a field pressure altitude of 3,000 ft., and a wind from 70° at 13 knots, with a runway heading of 30°, a 1° slope, and a length of 6500 ft. Reference will be made to the enlarged sectors shown in FIGS. 11 and 12 for the take-off and landing side problems respectively.

The wind velocity is first computed with the use of the wind component chart 62 to be a 10 knot component (T–11) in the direction of take-off (30°) (T–10). The pressure altitude 38 (here shown in green) is placed over the gross weight 40 (here shown in green) (T–1) and the ground run 48 is read by moving the cursor 16 to the phantom line position as shown in FIG. 3 with the hairline 20 positioned directly over the runway temperature (90° F.) (T–2) with a result of a 5,180 foot ground run at a take-off indicated airspeed of 120 knots. The subsequent corrections for wind and runway slope are taken first by reading the curved line for the wind component of 10 knots (T–4) on the wind component adjustment 50 which gives a resultant level runway take-off run of 4,650 ft. Thereafter the runway slope adjustment 52 is referred to and the correction (again in the blue scale) (T–5) gives a total runway length for take-off of 4,230 ft.

The acceleration speed hairline is then placed over the computed normal take-off ground run scale 58 at 4,230 ft. the computed ground run (T–6) and reading opposite the gross weight (15,100#) an acceleration check speed of 87 knots and a time of 28 seconds (T–7) is determined from the initial start. Thereafter to determine the available runway for minimum check speeds the cursor is set over the runway length of 6,500 ft. (T–8). This setting is made on the runway available scale 60. The check speed is then read underneath the hairline 61 as 76 knots at 32.5 seconds (T–9). For a minimum check speed, if the difference between the above answers is 10 knots or more, 10 knots is then deducted from the normal check speed (87 knots as determined above) and results in 77 knots. If the difference is less than 10 knots, then the minimum check speed as found is employed.

The operational data for climb and cruise settings is best illustrated in FIG. 1. There it will be seen that a typical flight condition is shown for a clearance for a flight at 25,000 ft., clearance to climb on course, with full service and two 230-gallon tip tanks for a T–33. The temperature deviation is an average climb altitude minus 6°.

By setting the altitude flight level window to flight level 25,000 ft. (C–1) a reading can be taken off the climb chart window (C–2) and the answer given is 9.9 minutes with a fuel consumption of 144 gallons and a distance flown of 50 nautical miles.

Turning then to the normal flight cruise level (C–3), which can be accomplished without moving the discs, there is a reading of 210 knots indicated airspeed, a true airspeed of 304 knots, and the approximate r.p.m. is 86%. Then turning to the fuel remaining window (C–4) and reading under the appropriate column for the initial fuel loading, in this instance 400 gallons, there is a reading of 210 gallons per hour as the consumption after the climb has been completed. All of the foregoing are achieved by merely making one setting on the computer.

The C and D scales are provided on the landing side of the computer around its entire periphery as indicated by reference numeral 64. The information is readily available by rotating the respective discs to determine the nautical and statute mark index for mileage conversions, the hour/minute scales for ground speed, time and distance problems; minute and hour conversion scale; fuel consumption computation; and percentage calculations. Thus after the completion of take-off and climb to cruise, the pilot is then able to continue using the same computer for his regular enroute calculations, and does not have to switch to another computer for this purpose.

A typical landing problem is shown in FIG. 5. There it will be seen that the condition is pre-set for 11,856#, with a field pressure altitude of 3,000 ft., field outside air temperature at aircraft level of 91° F., runway wind component of 20 knot headwind, runway slope of 1° downhill, and an RCR factor of 12.

To obtain the solution, the pressure altitude (green) is positioned opposite the landing gross weight scale (also green) of 3,000 ft. The scales are positioned to read these data as indicated in the landing window area (L–1) and the 50 ft. obstacle speed is shown as 115.5 knots, and a touchdown speed of 110 knots.

Without resetting the computer discs, the cursor 16 may then be moved in order to place the same above the runway temperature 91° F. (L–2) and the uncorrected ground roll over a 50 foot obstacle is shown as 3,440 ft. This figure is then converted first by the wind component scale (L–3) and then the runway slope scale (L–4) and finally read off on the cursor to the corrected runway roll shown at (L–5). The runway condition corrector is then employed and the corrected landing roll for 2,500 ft. is set opposite the dry condition or RCR 22 figure (L–6). Subsequently the actual corrected condition, based upon the problem runway correctoin factor of 12 (wet runway) is read as shown in the RCR window as 3,650 ft. (L–7). This represents a landing ground roll under the actual runway conditions, a wet runway, to clear a 50-foot obstacle and stop.

In review it will be seen that the single computer has been employed to accomplish virtually every flight computation problem the pilot will have for the particular aircraft relating to fuel consumption, fuel burn-out, runway length required under the various conditions with the information available, time distance problems, and the landing information the pilot needs based upon field conditions at the destination. While the illustrative computer has been shown as prepared for a T–33A type jet trainer, it will be appreciated that similar weight and flight characteristics can be set upon the same computer for other jet aircraft to and including the largest airline types which are flying today. The invention is independent of the particular aircraft employed, and is directed primarily to the positioning of the various indicia at varying locations on the flight data computer to maximize the available information, and minimize the number of settings required for the pilot to coordinate the available information.

Although particular embodiments of the invention have been shown and described in full here, there is no intention to thereby limit the invention to the details of such embodiments. On the contrary, the intention is to cover all modifications, alternative embodiments, usages and equivalents of the flight data computer as fall within the spirit and scope of the invention, specification, and appended claims.

I claim:
1. A flight data computer comprising, in combination,
a circular base card
a circumferential altitude portion on said base card
a circumferential runway temperature portion on said base card
a circumferential available runway portion on said base card
a movable circular member superposed over the base card and secured to the base card for relative rotation
a gross weight portion on said movable circular member adaptable for reading adjacent said circumferential altitude portion
a take-off run portion on said movable circular member adaptable for reading adjacent said runway temperature portion
acceleration check speed means on said movable circular member adaptable for reading adjacent said available runway portion
and numerical indicia on all said portions proportioned and oriented to permit a single setting of gross weight opposite altitude and read directly the take-off run opposite runway temperature whereupon the result may be set on the acceleration check speed means and available runway portion to determine minimum check speed conditions.

2. A flight data computer of claim 1 in which said acceleration check speed means comprise:
an arcuate sector window in said movable member
a radial hairline on said window
an arcuate sector with correlated speed and time data on the base card adaptable for reading beneath the hairline when the hairline is set against the available runway portion.

3. A flight data computer comprising, in combination,
a circular base card having a take-off indicia side and a landing indicia side
a circumferential altitude portion on said base card take-off side
a circumferential runway temperature portion on said base card take-off side
a circumferential available runway portion on said base card
a pair of movable circular members superposed over the base card on either side thereof and secured to the base card for relative rotation
a first movable member displaying take-off information and
a second movable member displaying landing indicia
a gross weight portion on said first movable circular member adaptable for reading adjacent said circumferential altitude portion on the take-off side
a take-off run portion on said first movable circular member adaptable for reading adjacent said runway temperature portion on the take-off side
acceleration check speed means on said first movable circular member adaptable for reading adjacent said available runway portion
corresponding landing indicia means including gross weight and landing run portions on said second movable circular member
corresponding landing indicia means including altitude and runway temperature portions on said base card landing side and said second movable member
and numerical indicia on all said portions proportioned and oriented to permit a single setting of gross weight opposite altitude and read directly the take-off or landing run opposite runway temperature.

4. A flight data computer of claim 3 in which said acceleration check speed means comprise:
an arcuate sector window in said movable member
a radial hairline on said window
an arcuate sector with correlated speed and time data on the base card adaptable for reading beneath the hairline when the hairline is set against the available runway portion.

5. A flight data computer comprising, in combination,
a circular base card
a circumferential green altitude portion on said base card
a circumferential blue runway temperature portion on said base card
a circumferential yellow available runway portion on said base card
a movable circular member superposed over the base card and secured to the base card for relative rotation a green weight portion on said movable circular member adaptable for reading adjacent said circumferential altitude portion a blue take-off run portion on said movable circular member adaptable for reading adjacent said runway temperature portion a yellow acceleration check speed means on said movable circular member adaptable for reading adjacent said available runway portion and numerical indicia on all said portions proportioned and oriented to permit a single setting of gross weight opposite altitude and read directly the take-off run opposite runway temperature whereupon the result may be set on the acceleration check speed means and available runway portion to determine minimum check speed conditions.

6. A flight data computer comprising, in combination, a circular base card a circumferential altitude portion on said base card a circumferential runway temperature portion on said base card an arcuate landing roll runway portion on said base card a movable circular member superposed over the base card and secured to the base card for relative rotation a gross weight portion on said movable circular member adaptable for reading adjacent said circumferential altitude portion a landing run portion on said movable circular member adaptable for reading adjacent said runway temperature portion runway condition corrector means on said movable circular member adaptable for reading adjacent said landing roll runway portion and numerical indicia on all said portions proportioned and oriented to permit a single setting of gross weight opposite altitude and read directly the landing run opposite runway temperature whereupon the result may be set on the runway condition corrector means and landing roll runway portion to determine corrected landing conditions.

7. A flight data computer comprising, in combination, a circular base card a circumferential altitude portion on said base card a circumferential runway temperature portion on said base card a circumferential available runway portion on said base card a movable circular member superposed over the base card and secured to the base card for relative rotation a gross weight portion on said movable circular member adaptable for reading adjacent said circumferential altitude portion a take-off run portion on said movable circular member adaptable for reading adjacent said runway temperature portion acceleration check speed means on said movable circular member adaptable for reading adjacent said available runway portion a wind component chart on said movable member arcuate sectors of wind and runway slope correctors radially adjacent the take-off run portion and numerical indicia on all said portions proportioned and oriented to permit a single setting of gross weight opposite altitude and read directly the take-off run opposite runway temperature to be corrected for wind and runway slope whereupon the result may be set on the acceleration check speed means and available runway portion to determine minimum check speed conditions.

8. A flight data computer comprising, in combination, a circular base card a circumferential altitude portion on said base card a circumferential runway temperature portion on said base card a circumferential available runway portion on said base card a movable circular member superposed over the base card and secured to the base card for relative rotation a gross weight portion on said movable circular member adaptable for reading adjacent said circumferential altitude portion a take-off run portion on said movable circular member adaptable for reading adjacent said runway temperature portion acceleration check speed means on said movable circular member adaptable for reading adjacent said available runway portion a flight level window on said movable member flight condition window means on said movable member a plurality of indicia on said base card positioned to appear in the windows displaying flight conditions through the window means responsive to an appropriate flight level setting and numerical indicia on all said portions proportioned and oriented to permit a single setting of gross weight opposite altitude and read directly the take-off run opposite runway temperature whereupon the result may be set on the acceleration check speed means and available runway portion to determine minimum check speed conditions.

9. A flight data computer comprising, in combination, a circular base card a circumferential altitude portion on said base card a circumferential runway temperature portion on said base card a circumferential available runway portion on said base card a movable circular member superposed over the base card and secured to the base card for relative rotation a gross weight portion on said movable circular member adaptable for reading adjacent said circumferential altitude portion a take-off run portion on said movable circular member adaptable for reading adjacent said runway temperature portion acceleration check speed means on said movable circular member adaptable for reading adjacent said available runway portion cross wind component chart means on said movable member a cross wind component correction sector radially spaced adjacent the take-off run portion to correct the same for the cross wind component taken from the cross wind chart and numerical indicia on all said portions proportioned and oriented to permit a single setting of gross weight opposite altitude and read directly the take-off run opposite runway temperature whereupon the result may be set on the acceleration check speed means and available runway portion to determine minimum check speed conditions.

10. A flight data computer comprising, in combination, a circular base card a circumferential altitude portion on said base card a circumferential runway temperature portion on said base card an arcuate landing roll runway portion on said base card a movable circular member superposed over the base card and secured to the base card for relative rotation a gross weight portion on said movable circular member adaptable for reading adjacent said circumferential altitude portion a landing run portion on said movable circular member adaptable for reading adjacent said runway temperature portion runway condition corrector means on said movable circular member adaptable for reading adjacent said landing roll runway portion a flight level window on said movable member flight condition window means on said movable member a plurality of indicia on said base card positioned to appear in the windows displaying flight conditions through the window means responsive to an appropriate flight level setting and numerical indicia on all said portions proportioned and oriented to permit a single setting of gross weight opposite altitude and read directly the landing run opposite runway temperature whereupon the result may be set on the runway condition corrector means and landing roll runway portion to determine landing conditions.

11. A flight data computer comprising, in combination, a circular base card a circumferential altitude portion on said base card a circumferential runway temperature portion on said base card an arcuate landing roll runway portion on said base card a movable circular member superposed over the base card and secured to the base card for relative rotation a gross weight portion on said movable circular member adaptable for reading adjacent said circumferential altitude portion a landing run portion on said movable circular member adaptable for reading adjacent said runway temperature portion runway condition corrector means on said movable circular member adaptable for reading adjacent said landing roll runway portion cross wind component chart means on said movable member a cross wind component correction sector radially spaced adjacent the landing run portion to correct the same for the cross wind component taken from the cross wind chart and numerical indicia on all said portions proportioned and oriented to permit a single setting of gross weight opposite altitude and read directly the landing run opposite runway temperature whereupon the result may be set on the runway condition corrector means and landing roll runway portion to determine corrected landing conditions.

12. A flight data computer comprising, in combination, a circular base card a circumferential altitude portion on said base card a circumferential runway temperature portion on said base card a circumferential available runway portion on said base card a movable circular member superposed over the base card and secured to the base card for relative rotation a gross weight portion on said movable circular member adaptable for reading adjacent said circumferential altitude portion a fuel weight arc and take-off speed arc radially spaced from said gross weight portion a take-off run portion on said movable circular member adaptable for reading adjacent said runway temperature portion acceleration check speed means on said movable circular member adaptable for reading adjacent said available runway portion and numerical indicia on all said portions proportioned and oriented to permit a single setting of gross weight opposite altitude and read directly the take-off run opposite runway temperature whereupon the result may be set on the acceleration check speed means and available runway portion to determine minimum check speed conditions.

13. A flight data computer comprising, in combination, a circular base card a circumferential altitude portion on said base card a circumferential runway temperature portion on said base card a circumferential available runway portion on said base card a movable circular member superposed over the base card and secured to the base card for relative rotation a gross weight portion on said movable circulation member adaptable for reading adjacent said circumferential altitude portion a take-off run portion on said movable circular member adaptable for reading adjacent said runway temperature portion acceleration check speed window means on said movable circular member adaptable for reading adjacent said available runway portion radially spaced gross weight indicia adjacent said window means and numerical indicia on all said portions proportioned and oriented to permit a single setting of gross weight opposite altitude and read directly the take-off run opposite runway temperature whereupon the result may be set on the acceleration check speed means and available runway portion to determine minimum check speed conditions.

14. A flight data computer comprising, in combination, a circular base card a circumferential altitude portion on said base card a circumferential runway temperature portion on said base card a circumferential available runway portion on said base card a movable circular member superposed over the base card and secured to the base card for relative rotation a gross weight portion on said movable circular member adaptable for reading adjacent said circumferential altitude portion take-off speed and fuel load data means radially spaced from said gross weight portion a take-off run portion on said movable circular member adaptable for reading adjacent said runway temperature portion wind and runway slope correction means radially spaced from said take-off run portion acceleration check speed means on said movable circular member adaptable for reading adjacent said available runway portion and numerical indicia on all said portions proportioned and oriented to permit a single setting of gross weight opposite altitude and read directly the take-off run opposite runway temperature whereupon the result may be set on the acceleration check speed means and available runway portion to determine minimum check speed conditions.

15. A flight data computer comprising, in combination, a circular base card a circumferential altitude portion on said base card a circumferential runway temperature portion on said base card a circumferential available runway portion on said base card a movable circular member superposed over the base card and secured to the base card for relative rotation a gross weight portion on said movable circular member adaptable for reading adjacent said circumferential altitude portion a take-off run portion on said movable circular member adaptable for reading adjacent said runway temperature portion acceleration check speed means on said movable circular member adaptable for reading adjacent said available runway portion numerical indicia on all said portions proportioned and oriented to permit a single setting of gross weight opposite altitude and read directly the take-off run opposite runway temperature whereupon the result may be set on the acceleration check speed means and available runway portion to determine minimum check speed conditions and a centrally pivoted cursor having a radial hairline for comparing the adjacent readings each to the other.

References Cited by the Examiner

UNITED STATES PATENTS

| | | | |
|---|---|---|---|
| 1,520,105 | 12/1924 | Bicknell | 235—70.1 |
| 2,393,922 | 1/1946 | McDowell | 235—84 |
| 2,623,696 | 12/1952 | Thrash | 235—61.02 X |
| 2,623,696 | 12/1952 | Trash | 235—61.02 X |
| 2,901,167 | 8/1959 | Mudge | 235—61.02 |
| 3,003,258 | 10/1961 | Stefano | 235—78 X |
| 3,084,858 | 4/1963 | Clapp | 235—84 |
| 3,109,588 | 11/1963 | Polhemus et al. | 235—88 |

FOREIGN PATENTS

| | | |
|---|---|---|
| 656,509 | 8/1951 | Great Britain. |
| 597,361 | 8/1959 | Italy. |

OTHER REFERENCES

Moe, Harris G.: "Flight Engineering and Cruise Control," J. Wiley, New York, 1947.

LEO SMILOW, *Primary Examiner.*